US007197646B2

(12) United States Patent
Fritz et al.

(10) Patent No.: US 7,197,646 B2
(45) Date of Patent: Mar. 27, 2007

(54) SYSTEM AND METHOD FOR PREVENTING AUTOMATED PROGRAMS IN A NETWORK

(75) Inventors: Adam T. Fritz, Seattle, WA (US); Yiqing Wang, Bothell, WA (US)

(73) Assignee: Disney Enterprises, Inc., Burbank, CA (US)

( * ) Notice: Subject to any disclaimer, the term of this patent is extended or adjusted under 35 U.S.C. 154(b) by 189 days.

(21) Appl. No.: 10/741,838

(22) Filed: Dec. 19, 2003

(65) Prior Publication Data

US 2005/0138376 A1   Jun. 23, 2005

(51) Int. Cl.
*H04K 1/00* (2006.01)
*H04L 9/00* (2006.01)
*G06F 3/00* (2006.01)
*G06F 9/00* (2006.01)
*G06F 17/00* (2006.01)

(52) U.S. Cl. .................. 713/182; 715/763; 715/741
(58) Field of Classification Search ............. 713/182, 713/183, 202; 715/763, 741; 709/225
See application file for complete search history.

(56) References Cited

U.S. PATENT DOCUMENTS

| | | | |
|---|---|---|---|
| 4,964,163 A | 10/1990 | Berry | |
| 5,163,097 A | 11/1992 | Pegg | |
| 5,345,549 A | 9/1994 | Appel et al. | |
| 5,497,422 A * | 3/1996 | Tysen et al. | ........ 713/157 |
| 5,608,387 A * | 3/1997 | Davies | ........ 340/5.27 |
| 6,134,657 A | 10/2000 | Johnson et al. | |
| 6,195,698 B1 * | 2/2001 | Lillibridge et al. | ...... 709/225 |
| 6,209,104 B1 * | 3/2001 | Jalili | ........ 713/202 |
| 6,615,264 B1 | 9/2003 | Stoltz et al. | |
| 6,980,081 B2 * | 12/2005 | Anderson | ........ 340/5.53 |
| 2002/0178058 A1 | 11/2002 | Ritchie et al. | |
| 2004/0199597 A1 * | 10/2004 | Libbey et al. | ........ 709/207 |

OTHER PUBLICATIONS von Ahn et al., The CAPTCHA Project, Sep. 26, 2002, Nov. 24, 2002, www.captcha.net, retrieved Aug. 17, 2005*
von Ahn et al., The CAPTCHA Project, Sep. 26, 2002, Nov. 24, 2002, www.captcha.net.*
Carnegie Melon School Of Computer Science, Bongo, Copyright 2000-2003, The CAPTCHA Project, All rights reserved, (p. 1 of 1).

* cited by examiner

*Primary Examiner*—Gilberto Barrón, Jr.
*Assistant Examiner*—Kristin D. Sandoval
(74) *Attorney, Agent, or Firm*—Greenberg Traurig LLP (57) ABSTRACT

A system and method are diminish the use of an automated program in a networked environment. A server can provide access to a service. In addition, a software module provides a client computer with a visual test upon a request transmitted through a network by the client computer for the service. The visual test requires the client computer to perform a predetermined action on a shaped object displayed on a video display in order to gain access to the service. A validation software module receives a request from the software module for the shaped object to be displayed on the video display. Further, the validation software module randomly selects a shaped object to be transmitted to the software module. The validation software module provides the software module with the shaped object. An access software module receives an access instruction from the validation software module if the client computer passes the visual test. The client computer can access the service if the client computer passes the visual test.

64 Claims, 4 Drawing Sheets

SYSTEM AND METHOD FOR PREVENTING AUTOMATED PROGRAMS IN A NETWORK

BACKGROUND

1. Field of the Invention

This invention relates generally to a method and system for restricting access to electronic services. More particularly, the present invention relates to diminishing the use of automated programs in a networked environment.

2. General Background

Many computer users currently use Internet services such as electronic mail ("e-mail"). The user connects his or her computer to the Internet through an Internet Service Provider ("ISP"). The user can then open an e-mail account through any number of e-mail services. Many of these e-mail services have a registration process in which the user must provide information such as a name, a user name, an address, etc. in order to open an e-mail account. Once an e-mail account is opened, the computer user can then send and receive messages from other computer users that use the Internet.

One of the continual problems facing Internet users is receiving e-mail called SPAM. SPAM is essentially junk e-mail that has relatively little worth to most e-mail users. E-mail users must spend a great deal of time looking through and deleting these unwanted e-mails from their mailboxes in order to keep their mailboxes from exceeding size limits imposed by ISP's. Further, SPAM expends a great deal of bandwidth on the Internet. A large number of resources are needed for transmitting and receiving junk e-mail. As a result, Internet resources that are used for more useful data flow have slower response times and are less efficient.

SPAM can be propagated in many different ways. One of the main causes of SPAM is computers that use scripts to impersonate users. During the registration process for an e-mail address, a computer can use a script to generate multiple e-mail addresses that do not even have a corresponding human user. These multiple e-mail addresses can then be used by the computer to send unwanted e-mail messages to other Internet users.

Computers can also be used to run scripts that send out multiple e-mail messages from a user generated e-mail address or from a script generated e-mail address to the same set of recipients. A computer user would take a great deal of time to send out a large number of e-mail messages to a set of recipients. On the other hand, a computer running a script can transmit e-mail messages at the speed that it would take thousands of computer users to perform the same task in the same amount of time.

Another area of services in which scripts pose a large problem is Internet voting services and Internet contests. The Internet has many web pages in which users can participate in a poll. For instance, users can vote for their favorite musician, artist, athlete, etc. The user can always return to the web page and vote another time, but the chances are small that most users will bother trying to vote again. However, a computer can use a script to vote a large number of times in a very small amount of time. The result is that the voting results are skewed a by a large amount. Further, a user that enters a contest will almost never win if a script places thousands of entries into the same contest.

Some approaches to solving the problem of computers running scripts involve the use of authentication schemes. For instance, a randomly selected string can be modified so that only a human user will be able to guess the result. A string of text can be rearranged over a shaded background so that the user can pick out the text. The user is then required to type in the text that stands out from the background.

A number of problems exist with this type of authentication scheme. Computer users do not want to spend the time to perform tedious tasks such as typing in a string of text to set up an e-mail account or to send an e-mail. Further, the static feature of this type of test allows more advanced image filtering programs to figure out the string. Finally, e-mail software that is dependent on a character set may make international deployment difficult.

SUMMARY

In order to solve the problems discussed above, a system and method are disclosed for diminishing the use of an automated program in a networked environment. In one aspect, a system includes a server that can provide access to a service. Accordingly, the service is stored on a memory associated with server. In addition, a software module is stored on the server. The software module provides a client computer with a visual test upon a request transmitted through a network by the client computer for the service. The visual test is displayed on a video display. Further, the visual test requires the client computer to perform a predetermined action on a shaped object displayed on the video display in order to gain access to the service. In addition, a validation software module is stored on the server. The validation software module receives a request from the software module for the shaped object to be displayed on the video display. Further, the validation software module randomly selects a shaped object to be transmitted to the software module. The validation software module provides the software module with the shaped object. An access software module receives an access instruction from the validation software module if the client computer passes the visual test. The client computer can access the service if the client computer passes the visual test.

In another aspect, a method restricts access of an automated program to computing services. A request to perform a computing service is received. Further, a determination is made as to whether a set of criteria has been met. If the set of criteria has not been met, a visual test is requested. The visual test includes a requirement that a predetermined action on a shaped object take place within a given time period. If the set of criteria has been met or if the predetermined action on the shaped object takes place within the given time period, the computing service is performed.

In another aspect, a system diminishes the use of an automated program in a networked computing environment. The system a server that can provide access to a service. Accordingly, the service is stored on a memory associated with server. In addition, a software module is stored on the server. The software module provides a client computer with a visual test upon a request transmitted through a network by the client computer for the service. The visual test is displayed on a video display. Further, the visual test requires the client computer to perform a predetermined action on a geometric shape displayed on the video display in order to gain access to the service. In addition, a validation software module is stored on the server. The validation software module receives a request from the software module for the geometric shape to be displayed on the video display. Further, the validation software module randomly selects a geometric shape to be transmitted to the software module, wherein the validation software module provides the software module with the geometric shape. An access software module receives an access instruction from the validation software module if the client computer passes the visual test. The client computer can access the service if the client computer passes the visual test.

In yet another aspect, a system diminishes the use of an automated program in a networked computing environment. The system a server that can provide access to a service. Accordingly, the service is stored on a memory associated with server. In addition, a software module is stored on the server. The software module provides a client computer with a visual test upon a request transmitted through a network by the client computer for the service. The visual test is displayed on a video display. Further, the visual test requires the client computer to perform a predetermined action on a non-textual based image displayed on the video display in order to gain access to the service. In addition, a validation software module is stored on the server. The validation software module receives a request from the software module for the non-textual based image to be displayed on the video display. Further, the validation software module randomly selects a non-textual based image to be transmitted to the software module, wherein the validation software module provides the software module with the non-textual based image. An access software module receives an access instruction from the validation software module if the client computer passes the visual test. The client computer can access the service if the client computer passes the visual test.

In another aspect, a method restricts access of an automated program in an electronic mail service. A request is received to send an e-mail message. Further, a determination is made as to whether a maximum number of recipients has been exceeded. A visual test is requested if the maximum number of recipients has been exceeded. The visual test includes a requirement that a predetermined action on a shaped object take place within a given time period. Further, the e-mail message is sent if the set of criteria has been met or if the predetermined action on the shaped object takes place within the given time period.

DETAILED DESCRIPTION OF THE INVENTION

In order to reduce the amount of SPAM that computer users receive, a system and method are disclosed for effectively distinguishing between human users and computer scripted users. The system and method make it difficult for automated scripts or any other automated computer programs to use image filtering programs to gain access to computing services.

Figure 1:
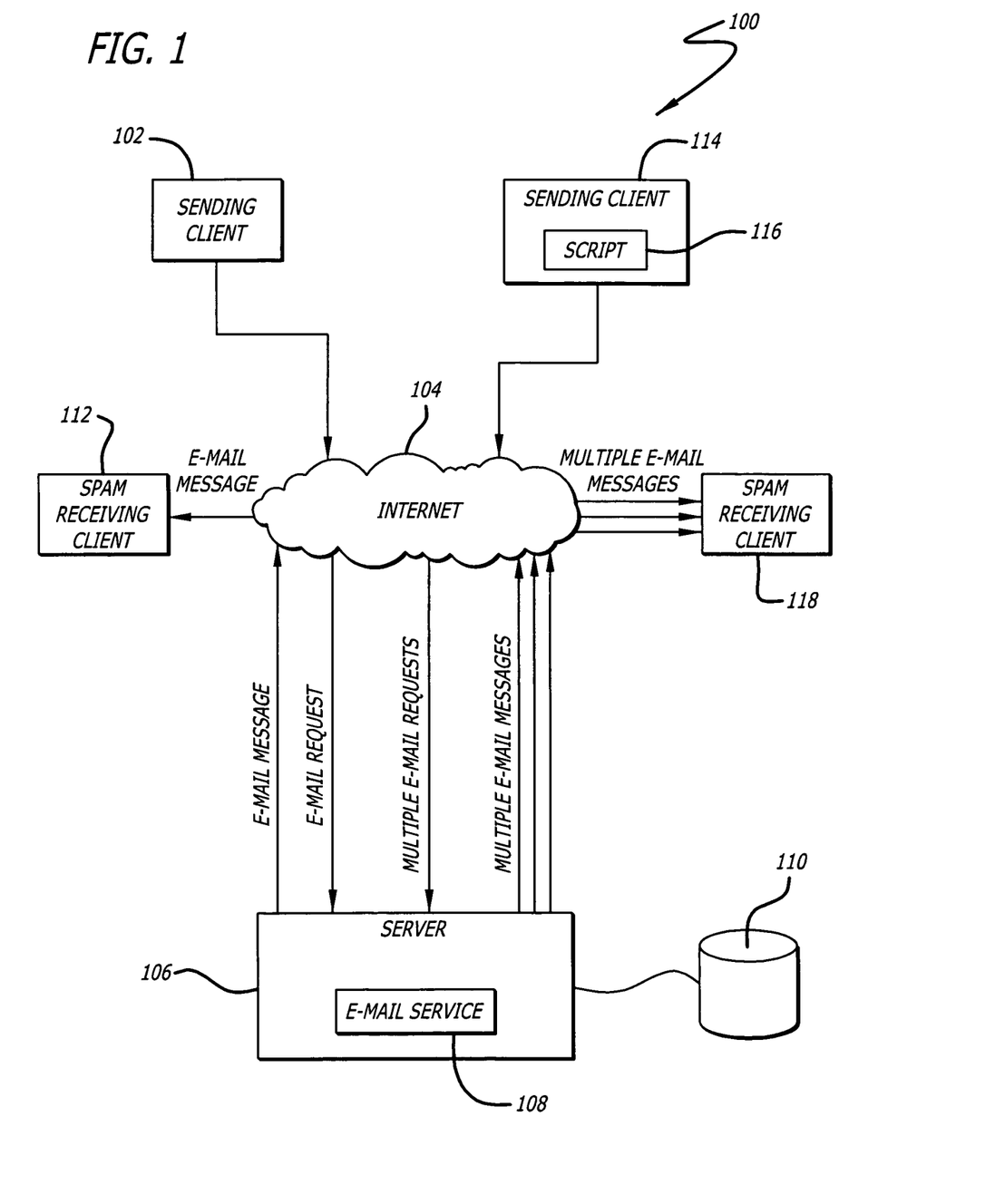
FIG. 1 illustrates a computing environment in which SPAM is not blocked.

FIG. 1 illustrates a computing environment 100 in which SPAM is not blocked. A sending client 102 is a computer from which a user can send an e-mail message. One of ordinary skill in the art will recognize that the sending client 102 can be any computing device such as a personal computer ("PC"), laptop, personal digital assistant ("PDA"), cellular phone, MP3 player, remote control, etc. The sending client 102 connects to a server 106 through the Internet 104. One of ordinary skill in the art will also recognize that this system and method can work in any type of network configuration including but not limited to a wireless network, local area network ("LAN"), world area network ("WAN"), etc. By connecting to the server 106, the sending client 102 is able to use an e-mail service 108 to compose an e-mail message. The server 106 is connected to a database 110 which stores data such as the inbox of the sending client 102. The database 110 can also store data such as an address book so that the user can send an e-mail to another user without having to remember the other user's e-mail address.

After the user composes the e-mail message, the user presses a send button (not shown) to instruct the e-mail service 108 to send the e-mail message to another e-mail address. The e-mail message is then routed through the Internet 104 to the appropriate e-mail address. A receiving client 112 then receives the e-mail message.

While the receiving client 112 is a computer that has a user who wanted to receive an e-mail message from the sending client 102, many computer users receive unwanted SPAM. One of the propagators of SPAM is a script sending client 114 that uses a script 116 to impersonate human users. One of ordinary skill in the art will recognize that the script 116 can be written using any known computer language. After the script sending client 114 connects to the server 106 through the Internet 104, the script sending client can compose a large number of e-mail messages in a short period of time using the e-mail service 108. As a result, a large number of e-mail messages can be transmitted through the Internet 104 to a SPAM receiving client 118.

Figure 2:
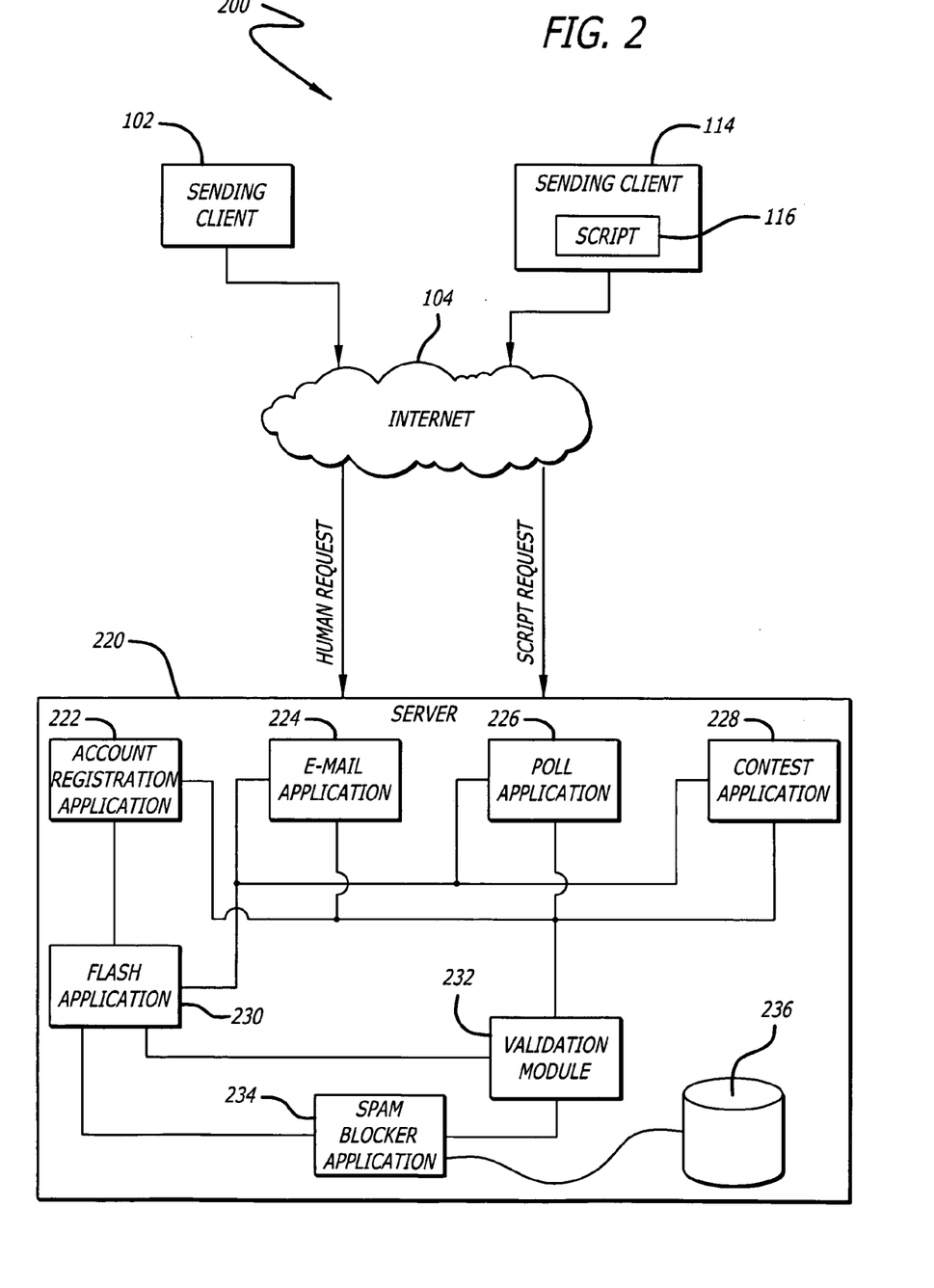
FIG. 2 illustrates a SPAM blocking system which can be used to reduce the amount of SPAM that the SPAM receiving client receives.

FIG. 2 illustrates a SPAM blocking system 200 which can be used to reduce the amount of SPAM that the SPAM receiving client 118 (FIG. 1) receives. As illustrated in FIG. 2, the sending client 102 or the script sending client 114 can connect to a SPAM blocking server 220 through the Internet 104. The SPAM blocking server 220 stores an account registration application 222. In one embodiment, the computer user can use the account registration application 222 to create an e-mail account. In another embodiment, the computer user can use the account registration application 222 to subscribe to electronic services such as electronic newsletters, electronic news, e-mail notifications, sports scores, etc. Further, the SPAM blocking server has an e-mail application 224 in which a user can send or receive e-mail using an e-mail account set up through the account registration application. In addition, the SPAM blocking server 220 has a poll application 226 in which the user can vote on a topic displayed on a web page stored in a database 230 associated with the SPAM blocking server 220. Finally, the SPAM blocking server 220 has a contest application 228 in which the computer user can enter a contest to win a prize. One of ordinary skill in the art will recognize that other types of applications such as games, videos, music, computer research, etc. can be provided by the SPAM blocking server 220.

In order for a computer user to use the account registration application 222, the e-mail application 224, the poll application 226, the contest application 228, or any other application restricted in a like manner, the computer user must prove that the computer user is human as opposed to the script 116. An authentication system will now be discussed for differentiating the human computer user from the script 116.

Restrictions on the use of certain applications stored on the SPAM blocking server 220 may invoke a flash application 230 that will provide a visual test for the computer user to pass in order for the restriction to be met. In one embodiment, the flash application 230 provides a visual test when a user attempts to register for an e-mail account using the account registration application 222. The SPAM blocking server 220 will likely want to ensure that all users that register for e-mail accounts are human users, not automated scripts. The SPAM blocking server 220 can have stringent requirements at the outset to preemptively ward off propagators of SPAM. One of ordinary skill in the art will recognize that the flash application 230 is mean to include future developments in graphics software. Future development may lead to graphics software that is even more difficult for image filtering programs to look through.

In one embodiment, a computer user submits identification information (e.g., name, user name, address, etc.) through the account registration application 222. After entering all of the information in the form, the user indicates that he or she has completed the form by pressing a button such as a send button, a complete button, a done button, etc. The flash application 230 then provides a visual test prior to submitting the information for establishing the e-mail account. In one embodiment, the flash application 230 displays a screen that has a randomly selected shaped object positioned at a randomly selected position therein. In one embodiment, the shaped object is a geometric shape. In another embodiment, the shaped object is a cartoon character. For instance, the shaped object can be Mickey Mouse. In another embodiment, the shaped object can be a graphically imaged character. For instance, an image of a person, pet, object, etc. can be graphically encoded to be used as the shaped object. In another embodiment, the shaped object is a graphical icon. For instance, images that are displayed on a computer can be used as the shaped object. In yet another embodiment, the flash application 230 displays a screen that has a randomly selected non-textual image positioned at a randomly selected position therein.

The computer user must select the shape with a mouse pointer to pass the visual test. In one embodiment, the user must select the shape within a given time limit. In another embodiment, if the user does not select the shape within the given time limit, the display screen is erased and another randomly selected shape appears at another randomly selected position within the display screen. In yet another embodiment, the randomly selected shapes at randomly selected positions are chosen and erased for a pre-determined number of times. If the user has not chosen the correct shape within the pre-determined number of displays of randomly selected shapes displayed in randomly selected positions, the user is not allowed to register for an e-mail account.

The use of the flash application 230 to generate the visual test makes the use of image filtering programs very difficult. The flash application 230 only appears to display one shape to the user on the display screen. However, the flash application 230 actually provides a variety of shapes to the display screen which are positioned in different layers of the display screen. In other words, the user only sees one shape on the display screen, but an image filtering program would see a large number of shapes to choose from.

The visual test is not limited to a randomly selected shape appearing at a randomly selected position. In an alternate embodiment, the visual test is a randomly selected shape that moves from one position in the display screen to a variety of different positions in the display screen. The user must "catch" the moving object by placing the mouse pointer over the moving object and by pressing the mouse button when the mouse pointer is over the moving object. An image filtering program will have an even more difficult time determining the location of a moving object and also determining the coordinates for the movement of the mouse pointer to "catch" the moving object. In yet another embodiment, the visual test requires the dragging of an object from a starting position to an ending position. An image filtering program would have great difficulty finding the location of the randomly selected object, determining the distance that the object has to be moved, and providing the coordinates for the positions that the mouse has to drag the object with. In yet another embodiment, the user must drag multiple objects together. For example, the user may have to drag one dot to touch another. The user may also have to put pieces of a puzzle together. In yet another embodiment, a user can shoot an object such as a ball at a target. The user may also be able to use a computerized gun or projectile propagator to send a computerized bullet or computerized projectile at a target in order to pass the visual test. For example, the user may play a computerized basketball to shoot a computerized basketball into a hoop to pass the visual test. The user may also be required to play computerized games such as pinball to pass the visual test.

In yet another embodiment, the flash application 230 can provide a visual test when a user attempts to use the e-mail application 224 to send an e-mail message. The SPAM blocking server 220 will want to prevent automated scripts from sending messages to a large number of recipients. On the other hand, the SPAM blocking server 220 may want to allow a human user to send a large number of messages. In one embodiment, a computer user composes an e-mail message and presses a send button in a graphical user interface ("GUI"). If the number of recipients is greater than a predetermined number of recipients, then the flash application 230 displays a visual test in the GUI. In one embodiment, the visual test is displayed in the same GUI that displays the e-mail message that is being composed. In another embodiment, the visual test is displayed in a separate GUI from the GUI that displays the e-mail message.

In another embodiment, the flash application 230 can provide a visual test when a user attempts to use the poll application 226. After the computer user presses a vote button displayed in a GUI, the flash application 230 can display a visual test that the computer user must pass before the SPAM blocking server 220 will actually place the vote. In another embodiment, the computer user must pass the visual test before having the opportunity to place a vote. One of ordinary skill in the art will recognize that the poll application 226 can be any of a wide variety of computer applications in which a vote is placed.

In another embodiment, the flash application 230 can provide a visual test when a user attempts to use the contest application 228 to enter a contest. One of ordinary skill in the art will recognize that the contest can be a game, sweepstakes, etc. Further, one of ordinary skill in the art will recognize that the contest can be with or without a prize winning.

In yet another embodiment, the flash application 230 can provide a visual test for any type of service that can be provided through a network. The flash application 230 can even be used as an extra layer of security for accessing secure web pages. For example, the visual test can be used as an extra layer of protection besides the use of a user name and a password.

The flash application 230 generates the visual test for the account registration application 222, the e-mail application 224, the poll application 226, or the contest application 228 by communicating with a validation module 232. In one embodiment, the validation module 232 is a validation application programming interface ("API"). In order to create a visual test, the flash application 230 requests a randomly selected geometric shape from the validation module 232. Subsequently, the validation module 232 provides a randomly selected geometric shape and an ID to the flash application 230. In one embodiment, the ID is a transaction ID. In another embodiment, the ID is a transaction ID. In yet another embodiment, the ID is a unique user identification. An example of a unique user identification is a "cookie". In another embodiment, the ID is an Internet Protocol ("IP") address. In yet another embodiment, the ID is an IP address and the date that a request for services was sent.

In one embodiment, the validation module 232 requests a randomly selected geometric shape from a SPAM Blocker application 234 which can access an image database 236. In yet another embodiment, the validation module 232 communicates directly with the image database 236.

The ID is a textual string used for identifying the geometric shape that was sent to the flash application 230 at a specific time. The validation module 232 retains a copy of the ID and the geometric shape in a memory associated with the validation module 232 for future lookup. The validation module 232 then sends the geometric shape and the ID to the flash application 230. In one embodiment, the validation module 232 encrypts the data that the validation module 232 provides to the flash application 230. One of ordinary skill in the art will be familiar with the different encryption algorithms. After receiving and decrypting the data (if necessary), the flash application 230 determines a random position within the display of the GUI in which to display the randomly selected geometric shape. In another embodiment, the validation module 232 also randomly selects a variety of additional geometric shapes that can be positioned by the flash application 230 at different layers of the GUI. As discussed above, the use of the additional geometric shapes at different layers of the GUI will help prevent image filtering programs from passing the visual test. In yet another embodiment, the flash application 230 can randomly select the geometric shape and/or the additional geometric shapes.

The flash application 230 can set different criteria for passing the visual test. In one embodiment, the computer user must select the randomly selected and randomly positioned geometric shape within a given time period. If the computer user does not select the randomly selected and randomly positioned geometric shape within the given time period, the computer user does not pass the visual test. If the computer user selects the randomly selected shape, the flash application 230 sends the randomly selected shape chosen by the computer user along with the ID to the validation module 232. In one embodiment, the randomly selected shape and the ID are encrypted by the flash application 230 prior to being sent to the validation module 232. After the validation module 232 receives the randomly selected geometric shape and the ID, the validation module 232 decrypts the randomly selected geometric shape and the ID (if necessary) and compares the randomly selected geometric shape and the ID that were received with the randomly selected geometric shape and the ID that were stored in the memory associated with the flash application 230. If the comparison results in a match, the computer user has passed the visual test. The validation module 232 then sends an access instruction to the Spam Blocker Application 234 which allows the computer user to access the requested service. If the computer user is an automated script, the computer user may attempt to guess a shape and a ID to be sent to the validation module 232. Accordingly, the validation module 232 will compare the received shape and the ID with the randomly selected shape and the ID that the validation module 232 stored in memory. A pure guess by an automated script is unlikely to produce the randomly selected shape and the ID. Therefore, the validation module 232 will likely find an incorrect comparison and deny the computer user access to the requested service.

In one embodiment, the validation module 232 will expire the ID for the randomly selected geometric shape after a comparison is made regardless of whether or not the comparison is successful. If the computer user is an automated script, the computer user may attempt to send a large number of guessed shapes and guessed ID's to the validation module 232. By expiring the current ID for a given randomly selected geometric shape, the validation module 232 further decreases the likelihood that an automated script will gain access to a requested service.

The Spam Blocker Application 234 is essentially a software program that prevents the computer user from accessing a requested service without meeting certain requirements. In one embodiment, the Spam Blocker Application 234 provides permission to the Flash Application 230 for the computer user to access the requested service. In yet another embodiment, the Flash Application 230 provides permission directly to the account registration application 222, the e-mail application 224, the poll application 226, or the contest application 228. In yet another embodiment, the SPAM Blocker Application provides the permission to the Validation Module 232. In one embodiment, the SPAM Blocker requires other criteria be met by other testing applications and provides permission to the Validation Module when these other testing applications have been passed.

One of ordinary skill in the art will recognize that the SPAM blocking system 200 can be applied to other types of applications such as games, videos, music, computer research, etc. The SPAM blocking system 200 can even be used to restrict the viewing of content on a web page.

Figure 3:
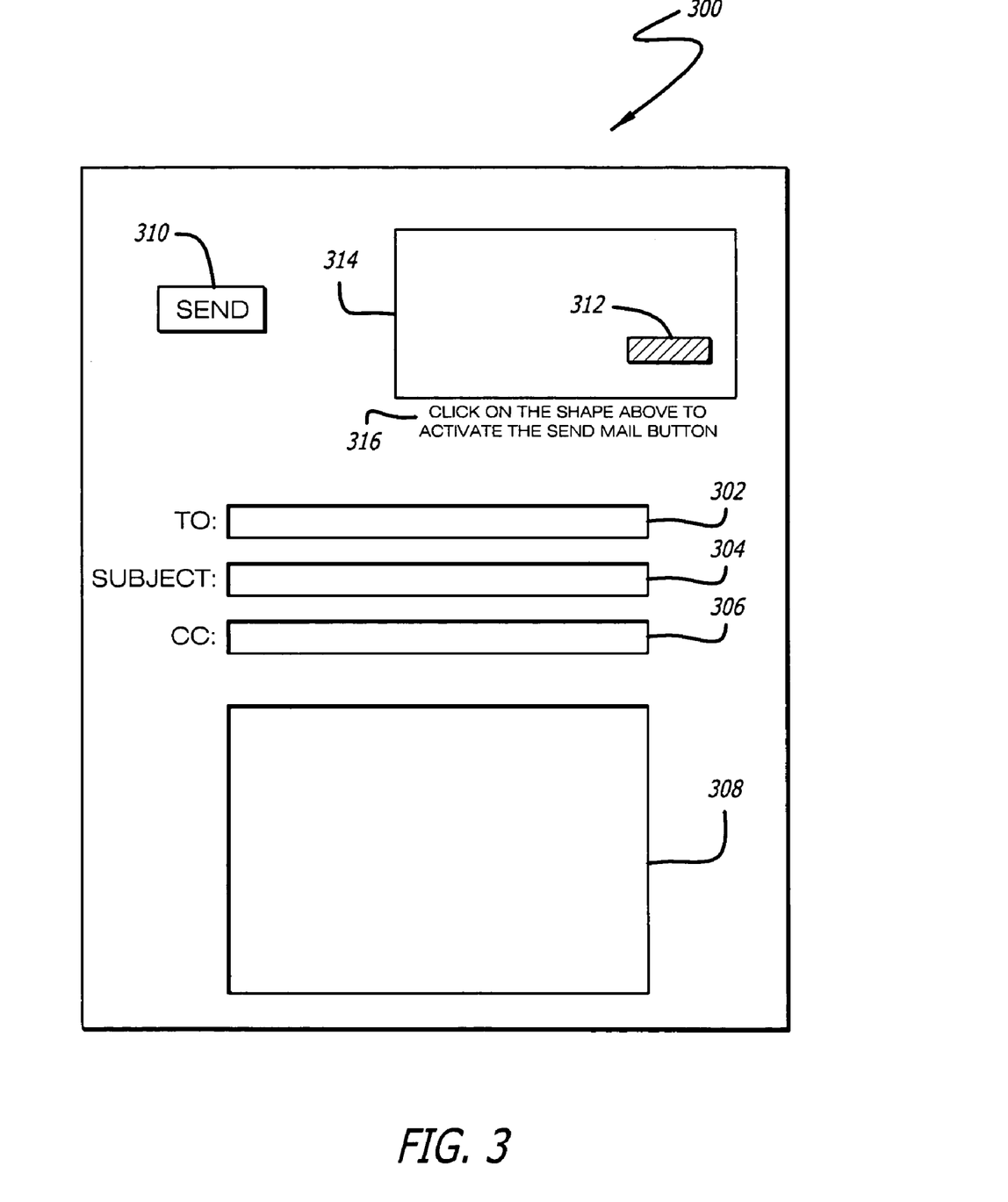
FIG. 3 illustrates a video display in which a computer user can compose an e-mail message using the e-mail application.

FIG. 3 illustrates a video display 300 in which a computer user can compose an e-mail message using the e-mail application 224. The video display 300 can be a GUI displayed in a web browser or in another software application. The video display 300 has data entry lines such as a To data entry line 302, a Subject data entry line 304, and a CC data entry line 306. One of ordinary skill in the art will recognize that additional data entry lines such as a From data entry line can be incorporated into the video display. The computer user can enter recipients into the To data entry line 302. In addition, the computer user can enter the text of the e-mail message into a text box 308. After the user has finished composing an e-mail message, the computer user can press a send button 310 to indicate that the e-mail should be sent to the recipient(s). The flash application module 230 (FIG. 2) will request a randomly selected shape from the validation module 232. In one embodiment, the flash application 230 displays a randomly selected shape 312 that the flash application 230 receives from the validation module 232 in a verification display 314. A set of directions 316 is displayed so that the computer user is informed of the action that the computer user must take to pass the visual test displayed in the verification display 314. In one embodiment, the set of directions 316 is constructed according to criteria stored in the flash application 230. If the computer user performs the action as instructed by the set of directions 316 in a given time period, the composed e-mail message is sent to the recipients. On the other hand, if the computer user does not perform the requested action within the given time period, the computer's e-mail message does not get sent to the recipients based on the assumption that a human user would have been able to pass the visual test depicted in the verification display 314. In another embodiment, the computer user is given multiple chances to pass the visual test. For instance, a computer user may get up and walk away from the computer as the visual test is displayed. Therefore, after the given time period has elapsed, another randomly selected shape appears within the verification window. The computer user will only be given a predetermined number of chances. Each of these chances could comprise different visual tests. The visual test on the first chance may be selecting a geometric object while the visual test on the second chance may be dragging a geometric object from a starting position to an ending position. The set of directions 316 would change on each chance to inform the computer user of the requirements need to pass the visual test. By varying the visual test on each chance given to the computer user, an automated script has an even more difficult time in gaining access to the requested services. In yet another embodiment, the computer user is only given subsequent chances if the computer user does not make an attempt at the visual test. In another embodiment, the verification display 314 is a separate screen from the visual display 300. In yet another embodiment, the verification display 314 is displayed in the same web browser but on a different web page from the visual display 300.

One of ordinary skill in the art will recognize that GUI's similar to the visual display 300 can be constructed for services other than the e-mail application 224, e.g. the account registration application 222, the poll application 226, or the contest application 228. Further, one of ordinary skill in the art will recognize that the visual display 300 can be displayed on an LCD screen, a plasma screen, a PDA display, and any other visual medium for displaying data.

Figure 4:
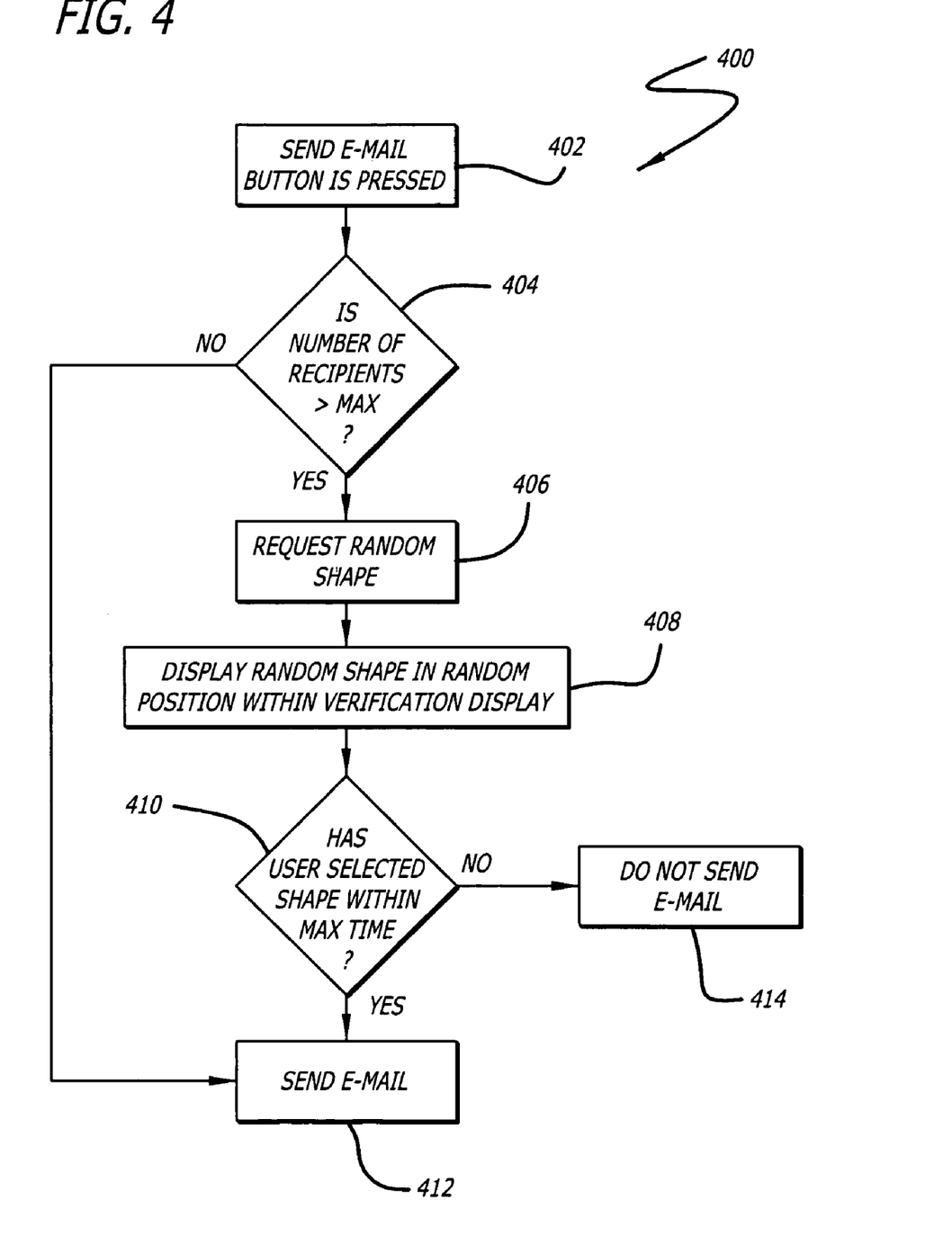
FIG. 4 illustrates a process for reducing the use of automated scripts in services such as the account registration application, the e-mail application, the poll application, or the contest application.

FIG. 4 illustrates a process 400 for reducing the use of automated scripts in services such as the account registration application 222, the e-mail application 224, the poll application 226, or the contest application 228. By way of example, the process 400 is explained with respect to the e-mail application 224. After a computer user composes an e-mail message as explained in FIG. 3, the computer user presses the send button 310 at a process block 402 to send the e-mail message the recipient(s). The process 400 then advances to a decision block 404 where the process 400 determines if the number of recipients exceeds a predetermined minimum requirement. Computer users would be inconvenienced if they had to pass the visual test every time they send an a e-mail message to a few people. Therefore, if the number of recipients is less than a predetermined minimum, the process 400 advances to a process block 412 where the e-mail message is sent to the recipient(s). However, if the number of recipients is greater than a predetermined minimum, then the process 400 advances to a process block 406 where the flash application 230 (FIG. 2) requests a randomly generated geometric shape from the validation module 232 based on the assumption that an e-mail sent to a large number of recipients may be made by an automated script. In another embodiment, a maximum number of recipients can also be set and test in the process block 404.

After the flash application 230 receives the randomly selected geometric shape at the process block 406, the flash application 230 selects a random position within the verification display 314 to display the randomly selected geometric shape at a process block 408. The process 400 then advances to a decision block 410 where the process 400 determines if the computer user has selected the geometric shape within a predetermine maximum amount of time. If the computer user selects the geometric shape within the predetermined amount of time, the process 400 assumes that the computer user is a human user and sends the e-mail. However, if the computer user does not select the geometric shape within the predetermine amount of time, the process 400 assumes that the computer user is an automated script and does not send the e-mail message. One of ordinary skill in the art will recognize that other embodiments may include the variations discussed with respect to FIG. 3 for providing the computer user with multiple chances after the maximum period of time has elapsed subject to a maximum number of chances.

While the above description contains many specifics, these should not be construed as limitations on the scope of the invention, but rather as an exemplification of preferred embodiments thereof. The invention includes any combination or subcombination of the elements from the different species and/or embodiments disclosed herein. One skilled in the art will recognize that these features, and thus the scope of the present invention, should be interpreted in light of the following claims and any equivalents thereto.

We claim:

1. A system for diminishing the use of an automated program in a networked computing environment comprising:

a server that can provide access to a service, wherein the service is stored on a memory associated with the server;

a visual test software module associated with the server, wherein the visual test software module is capable of providing a client computer with a visual test upon a request transmitted through a network by the client computer for the service, wherein the visual test is displayed on a video display, wherein the visual test enables the client computer to perform a predetermined action over a shaped object displayed on the video display in order to gain access to the service, wherein the predetermined action over the shaped object causes movement of the shaped object within the video display;

a validation software module associated with the server, wherein the validation software module receives a request from the software module for the shaped object to be displayed on the video display, wherein the validation software module randomly selects the shaped object to be transmitted to the visual test software module and provides the visual test software module with the shaped object; and an access software module, wherein the access software module receives an access instruction from the validation software module and provides access to the service upon successful execution of the visual test.

2. The system of claim 1, wherein the visual test software module is a flash software module.

3. The system of claim 1, wherein the validation software module provides an id along with the shaped object to the visual test software module.

4. The system of claim 3, wherein the id is a session id.

5. The system of claim 3, wherein the id is a unique user identifier.

6. The system of claim 3, wherein the id is an ip address.

7. The system of claim 3, wherein the id is the ip address and time that the request was made.

8. The system of claim 3, wherein the visual test software module provides the id along with a user selected shaped object to the validation software module.

9. The system of claim 8, wherein the validation software module determines if the user selected shaped object and the associated id that the validation software module receives from the visual test software module are identical to the id and the shaped object that the validation software module previously sent to the visual test software module.

10. The system of claim 9, wherein the validation software module provides an access instruction to the access module.

11. The system of claim 10, wherein the access module provides the client computer access to the service.

12. The system of claim 10, wherein the id expires after the validation software module determines if the user selected shaped object and the associated id that the validation software module receives from the visual test software module are identical to the id and the shaped object that the validation software module previously sent to the validation software module.

13. The system of claim 1, wherein the validation module provides a plurality of false shapes to the visual test software module in order to make image filtering more difficult.

14. The system of claim 1, wherein the predetermined action comprises a selection with a mouse pointer of the shaped object displayed within the video display within a predetermined time period.

15. The system of claim 1, wherein the predetermined action comprises a dragging of the shaped object displayed within the video display within a predetermined time period.

16. The system of claim 1, wherein the shaped object is a geometric shape.

17. The system of claim 1, wherein the shaped object is a cartoon character.

18. The system of claim 1, wherein the shaped object is a graphically imaged character.

19. The system of claim 1, wherein the shaped object is a graphical icon.

20. The system of claim 1, wherein the service is an account registration service.

21. The system of claim 20, wherein an e-mail account can be created with the account registration service.

22. The system of claim 21, wherein an electronic subscription can be created with the account registration service.

23. The system of claim 1, wherein the service is an electronic mail service.

24. The system of claim 1, wherein the service is a poll service.

25. The system of claim 1, wherein the service is a contest service.

26. The system of claim 1, wherein the service is access to web-based content.

27. The system of claim 1, wherein the service is access to electronic content.

28. The system of claim 1, wherein the automated program is an automated script.

29. The system of claim 1, wherein the network is the Internet.

30. The system of claim 1, wherein the network is a wireless network.

31. The system of claim 1, wherein the network is a local area network.

32. The system of claim 1, wherein the network is a world area network.

33. A system for diminishing the use of an automated program in a networked computing environment comprising:
a server that can provide access to a service, wherein the service is stored on a memory associated with the server;
a visual test software module associated with the server, wherein the visual test software module is capable of providing a client computer with a visual test upon a request transmitted through a network by the client computer for the service, wherein the visual test is displayed on a video display, wherein the visual test enables the client computer to perform a predetermined action over a non-textual based image displayed on the video display in order to gain access to the service, wherein the predetermined action causes movement of the non-textual based image within the video display;
a validation software module associated with the server, wherein the validation software module receives a request from the visual test software module for the non-textual based image to be displayed on the video display, wherein the validation software module randomly selects a non-textual based image to be transmitted to the visual test software module and provides the visual test software module with the non-textual based image; and
an access software module, wherein the access software module receives an access instruction from the validation software module and provides access to the service upon successful execution of the visual test.

34. The system of claim 33, wherein the visual test software module is a flash software module.

35. The system of claim 33, wherein the validation software module provides an id along with the non-textual based image to the visual test software module.

36. The system of claim 35, wherein the id is a session id.

37. The system of claim 35, wherein the id is a unique user identifier.

38. The system of claim 35, wherein the id is an ip address.

39. The system of claim 35, wherein the id is the ip address and time that the request was made.

40. The system of claim 35, wherein the visual test software module provides the id along with a user selected non-textual based image to the validation software module.

41. The system of claim 40, wherein the validation software module determines if the user selected shaped object and the associated id that the validation software module receives from the visual test software module are identical to the id and the shaped object that the validation software module previously sent to the visual test software module.

42. The system of claim 41, wherein the validation software module provides an access instruction to the access module.

43. The system of claim 42, wherein the access module provides the client computer access to the service.

44. The system of claim 42, wherein the id expires after the validation software module determines if the user selected non-textual based image and the associated id that the validation software module receives from the visual test software module are identical to the id and the non-textual based image that the validation software module previously sent to the validation software module.

45. The system of claim 33, wherein the validation module provides a plurality of false shapes to the visual test software module in order to make image filtering more difficult.

46. The system of claim 33, wherein the predetermined action comprises a selection with a mouse pointer of the non-textual based image displayed within the video display within a predetermined time period.

47. The system of claim 33, wherein the predetermined action comprises a dragging of the non-textual based image displayed within the video display within a predetermined time period.

48. The system of claim 33, wherein the non-textual based image is a geometric shape.

49. The system of claim 33, wherein the non-textual based image is a cartoon character.

50. The system of claim 33, wherein the non-textual based image is a graphically imaged character.

51. The system of claim 33, wherein the non-textual based image is a graphical icon.

52. The system of claim 33, wherein the service is an account registration service.

53. The system of claim 52, wherein an e-mail account can be created with the account registration service.

54. The system of claim 53, wherein an electronic subscription can be created with the account registration service.

55. The system of claim 33, wherein the service is an electronic mail service.

56. The system of claim 33, wherein the service is a poll service.

57. The system of claim 33, wherein the service is a contest service.

58. The system of claim 33, wherein the service is access to web-based content.

59. The system of claim 33, wherein the service is access to electronic content.

60. The system of claim 33, wherein the automated program is an automated script.

61. The system of claim 33, wherein the network is the Internet.

62. The system of claim 33, wherein the network is a wireless network.

63. The system of claim 33, wherein the network is a local area network.

64. The system of claim 33, wherein the network is a world area network.

* * * * *